(12) United States Patent
Peters

(10) Patent No.: US 7,896,357 B2
(45) Date of Patent: *Mar. 1, 2011

(54) UNIVERSAL TOOL BIT SHANK

(75) Inventor: Michael P. Peters, Lutherville, MD (US)

(73) Assignee: Black & Decker Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/700,347

(22) Filed: Feb. 4, 2010

(65) Prior Publication Data

US 2010/0133762 A1 Jun. 3, 2010

Related U.S. Application Data

(63) Continuation of application No. 11/322,183, filed on Dec. 29, 2005, now Pat. No. 7,726,664.

(51) Int. Cl.
*B23B 31/10* (2006.01)

(52) U.S. Cl. ............ 279/143; 279/23.1; 279/29; 279/80; 279/82; 279/906; 408/226; 408/239 A

(58) Field of Classification Search ................. 279/23.1, 279/29, 76, 78–80, 82, 143–145, 906; 408/226, 408/239 A, 239 R; *B23B 31/10, 31/107*
See application file for complete search history.

(56) References Cited

U.S. PATENT DOCUMENTS

| 748,398 | A | * | 12/1903 | Middleton | 279/103 |
|---|---|---|---|---|---|
| 991,884 | A | * | 5/1911 | Osgood | 408/226 |
| 993,395 | A | * | 5/1911 | Newbold | 279/103 |
| 2,029,447 | A | * | 2/1936 | Swain | 408/144 |
| 2,468,874 | A | * | 5/1949 | Hawkins | 408/226 |
| 2,608,180 | A | * | 8/1952 | Curtis | 173/132 |
| 2,806,706 | A | | 9/1957 | Fitch | |
| 2,940,765 | A | * | 6/1960 | Appleby | 279/16 |
| 3,136,347 | A | * | 6/1964 | Linquist | 408/226 |
| 3,726,533 | A | * | 4/1973 | Lafferty, Sr. | 279/97 |
| 3,734,515 | A | * | 5/1973 | Dudek | 279/144 |
| 3,843,143 | A | | 10/1974 | Laxson | |
| 3,982,846 | A | * | 9/1976 | Steinbach | 408/226 |
| D245,395 | S | | 8/1977 | Cognevich | |
| 4,051,905 | A | * | 10/1977 | Kleine | 173/104 |
| 4,187,045 | A | * | 2/1980 | Fischer | 408/240 |
| 4,189,976 | A | | 2/1980 | Becker | |
| 4,448,097 | A | | 5/1984 | Rocca | |
| 4,629,375 | A | * | 12/1986 | Lieser | 408/239 R |
| 4,692,073 | A | | 9/1987 | Martindell | |
| 4,818,157 | A | * | 4/1989 | Kouvelis | 408/240 |
| D316,363 | S | * | 4/1991 | Lisenbee | D8/70 |
| 5,033,920 | A | * | 7/1991 | Cantanese | 408/239 R |
| D318,781 | S | | 8/1991 | Nishiki | |
| 5,398,946 | A | | 3/1995 | Quiring | |

(Continued)

FOREIGN PATENT DOCUMENTS

DE 3008394 6/1984

(Continued)

*Primary Examiner* — Eric A Gates
(74) *Attorney, Agent, or Firm* — Scott B. Markow

(57) ABSTRACT

A universal tool shank can include an elongate body having first and second portions. The first portion can include at least one flat thereon for engagement with a recess in a first tool. The second portion can include at least one protrusion extending radially outwardly therefrom for engagement with a recess in a second tool. The first and second portions can be disposed axially apart from one another.

11 Claims, 4 Drawing Sheets

U.S. PATENT DOCUMENTS

| | | | |
|---|---|---|---|
| 5,417,527 A * | 5/1995 | Wienhold | 408/239 R |
| D365,113 S | 12/1995 | Ronan | |
| D378,655 S | 4/1997 | Anderson | |
| D384,563 S * | 10/1997 | Robinson | D8/70 |
| 5,901,622 A | 5/1999 | Sweeny | |
| D415,180 S | 10/1999 | Rosanwo | |
| 6,053,675 A | 4/2000 | Holland et al. | |
| D429,262 S | 8/2000 | Streich | |
| 6,270,085 B1 | 8/2001 | Chen et al. | |
| D449,504 S | 10/2001 | Boyle et al. | |
| 6,311,989 B1 | 11/2001 | Rosanwo | |
| 6,349,948 B1 | 2/2002 | Wu | |
| 6,354,177 B2 | 3/2002 | Peters | |
| 6,363,819 B1 | 4/2002 | Li | |
| D457,046 S | 5/2002 | Boyle et al. | |
| D457,797 S | 5/2002 | Huang | |
| 6,474,656 B1 | 11/2002 | Thomas | |
| 6,488,452 B1 * | 12/2002 | Hoskins et al. | 408/239 R |
| 6,494,121 B1 | 12/2002 | Hu | |
| 6,511,268 B1 * | 1/2003 | Vasudeva et al. | 408/239 R |
| 6,520,509 B1 * | 2/2003 | Vasudeva et al. | 279/145 |
| 6,543,959 B1 | 4/2003 | Jore | |
| 6,572,311 B2 * | 6/2003 | Vasudeva | 408/226 |
| D478,263 S | 8/2003 | Welsh | |
| D479,253 S | 9/2003 | Chen | |
| 6,637,755 B2 | 10/2003 | Chen et al. | |
| 6,695,321 B2 | 2/2004 | Bedi et al. | |
| 6,722,667 B2 | 4/2004 | Cantlon | |
| 6,755,423 B2 | 6/2004 | Chiu | |
| 6,755,424 B1 | 6/2004 | Paulsen | |
| D497,300 S | 10/2004 | Chen | |
| 6,808,182 B2 | 10/2004 | Lin | |
| D498,403 S * | 11/2004 | Singh | D8/86 |
| 6,813,978 B1 | 11/2004 | Karpp | |
| 6,860,489 B2 | 3/2005 | Chen | |
| 6,863,280 B2 | 3/2005 | Chiu | |
| 6,874,791 B2 * | 4/2005 | Chen et al. | 279/75 |
| 6,877,751 B2 | 4/2005 | Hsing | |
| 6,929,266 B2 | 8/2005 | Peters et al. | |
| 6,938,526 B2 * | 9/2005 | Milbourne et al. | 81/466 |
| D516,894 S * | 3/2006 | Singh | D8/86 |
| D525,101 S * | 7/2006 | Singh | D8/86 |
| 7,097,398 B2 * | 8/2006 | Hernandez, Jr. | 408/224 |
| 7,287,449 B2 * | 10/2007 | Abel et al. | 81/177.2 |
| D563,750 S * | 3/2008 | Peters | D8/70 |
| 2003/0057661 A1 | 3/2003 | Thomas | |
| 2004/0240954 A1 * | 12/2004 | Chilcott | 408/239 A |
| 2004/0262856 A1 | 12/2004 | Cantlon | |
| 2005/0105983 A1 * | 5/2005 | Hernandez, Jr. | 408/239 R |
| 2007/0145694 A1 * | 6/2007 | Ullrich et al. | 279/143 |
| 2009/0224492 A1 * | 9/2009 | Lin | 279/82 |
| 2009/0279972 A1 * | 11/2009 | Novak et al. | 408/239 R |

FOREIGN PATENT DOCUMENTS

| | | |
|---|---|---|
| EP | 0891831 | 1/1999 |
| WO | WO-00/51790 | 9/2000 |

* cited by examiner

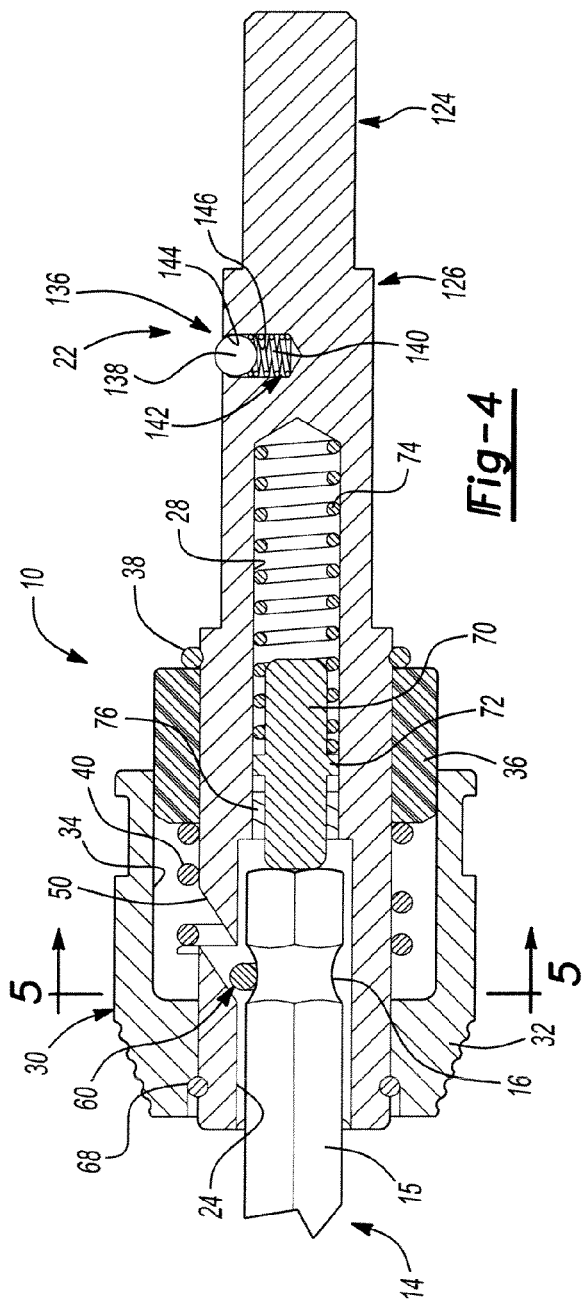
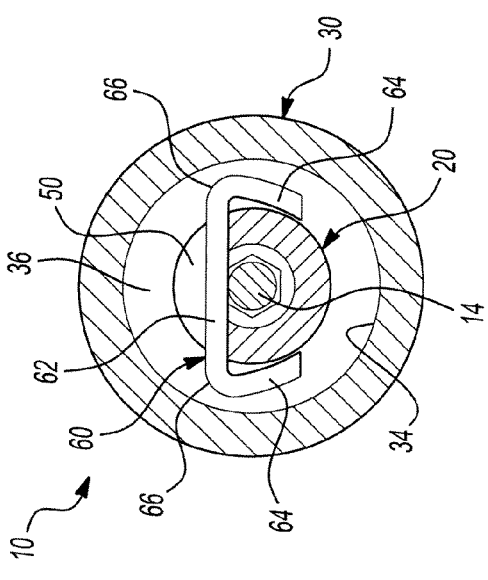
Fig-4
Fig-5

UNIVERSAL TOOL BIT SHANK

RELATED APPLICATIONS

This application is a continuation of U.S. patent application Ser. No. 11/322,183, filed Dec. 29, 2005, now pending, titled "Universal Tool Bit Shank," which is incorporated by reference.

FIELD

The present disclosure relates to tools, and more particularly to tool shanks.

BACKGROUND

The statements in this section merely provide background information related to the present disclosure and may not constitute prior art.

A variety of tool bits are available for use with drivers. However, these tool bits often have unique engagement portions. The drivers also often have a unique tool bit receiving portion. As a result, a tool bit that is able to be coupled to one type of driver may not be able to be coupled to a different type of driver.

SUMMARY

A universal tool shank can include an elongate body having first and second portions. The first portion can include at least one flat thereon for engagement with a recess in a first tool. The second portion can include at least one protrusion extending radially outwardly therefrom for engagement with a recess in a second tool. The first and second portions can be disposed axially apart from one another.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a longitudinal cross-sectional view similar to that of FIG. 3, but illustrating the tool bit fully inserted in the chuck assembly;

FIG. 5 is a lateral or radial cross-sectional view, taken generally along line 5-5 of FIG. 4;

DETAILED DESCRIPTION

The following description is merely exemplary in nature and is not intended to limit the present disclosure, application, or uses.

FIGS. 1 through 6 depict an exemplary embodiment of a chuck assembly or tool bit holder according to the present disclosure, shown merely for purposes of illustration. One skilled in the art will readily recognize, from the following discussion and the accompanying drawings, that chuck assemblies or bit holders of configurations other than that of this exemplary illustration can also advantageously employ the principles of the present disclosure.

Figure 1:
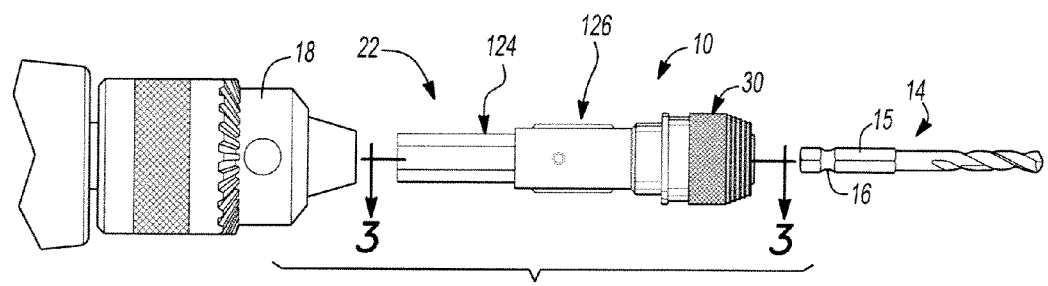
FIG. 1 is a plan view of a tool, a chuck assembly, and a tool bit in accordance with the present disclosure.
Figure 2:
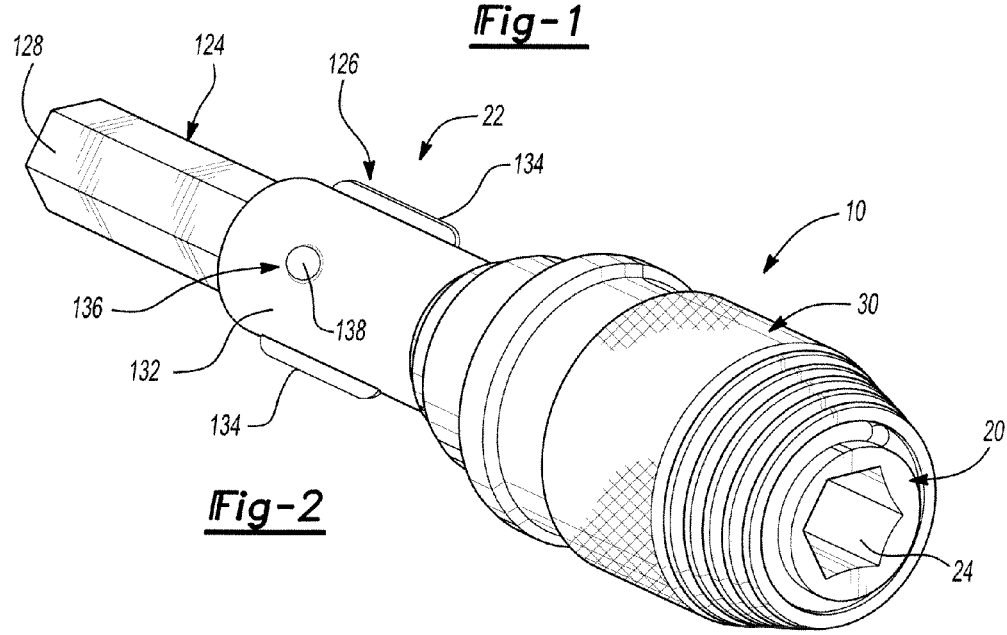
FIG. 2 is a perspective view of the chuck assembly of FIG. 1.
Figure 3:
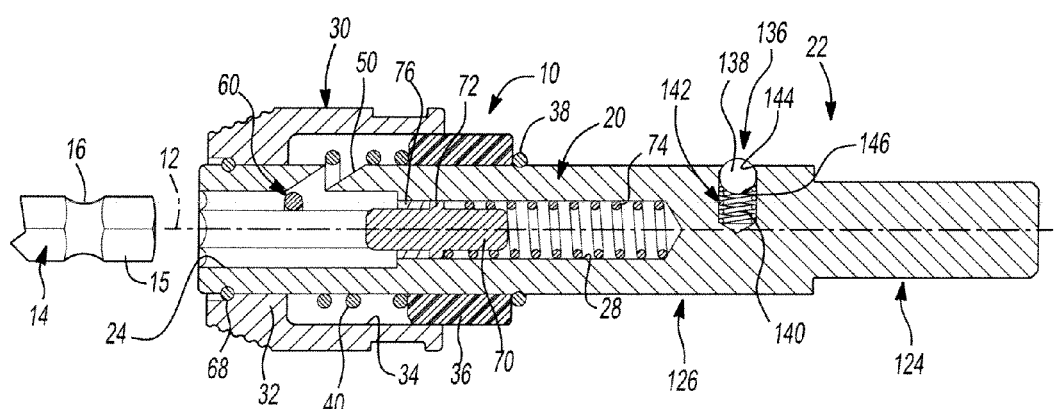
FIG. 3 is a longitudinal or axial cross-sectional view taken generally along line 3-3 of FIG. 1, illustrating a tool bit prior to insertion into the chuck assembly.

In FIGS. 1 through 6, an exemplary chuck assembly or bit holder 10 is attachable to a power tool or to a hand tool 18 to be driven for rotation about an axis 12 (shown in FIG. 3). The chuck assembly 10 is adapted to removably receive a tool bit 14 having a generally hex-shaped shank 15 with a circumferential recess 16 formed therein. The tool bit 14 can be any of a number of well-known bits, including drill bits, nut driver bits, screwdriver bits, or other types of fastener driver bits, for example.

Figure 6:
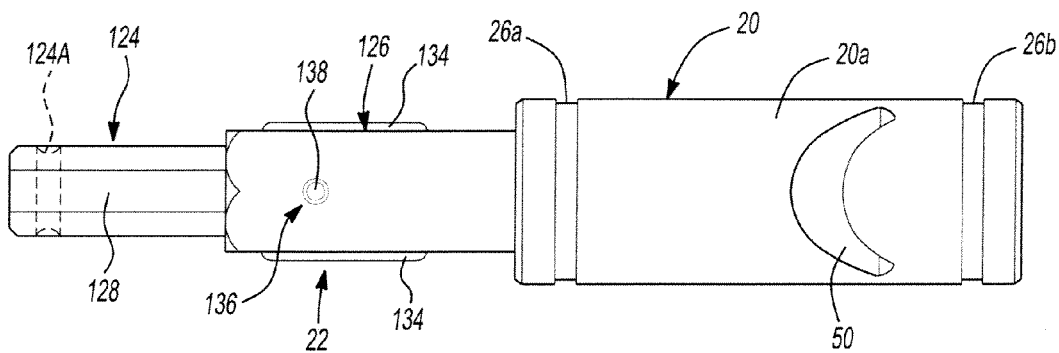
FIG. 6 is a side view of a body portion of the chuck assembly.

As best shown in FIGS. 3 and 6, the chuck assembly 10 generally includes a body 20, having a shank portion 22 thereon for mounting the chuck assembly 10 for rotation by a hand tool or a power tool. A hex-shaped socket or bore 24 is formed in the body 20, with the bore 24 opening axially outwardly toward the front or forward end of the chuck assembly 10. A pair of annular retainer grooves 26a, 26b are provided at opposite ends of a cylindrical main body portion 20a of the body 20 (as best shown in FIG. 6). A plunger bore 28 extends axially from the hex-shaped socket or bore 24 toward the rear end of the chuck assembly 10.

A generally cylindrical hollow retraction collar 30 surrounds a portion of the radially outer periphery of the body 20 and is axially slidable thereon. The hollow retraction collar or sleeve 30 includes a radially inwardly-directed forward flange 32 slidably surrounding a portion of the body 20, with a hollow internal bore 34 within the retraction collar 30 opening in an axially-rearward direction and being of a diameter sufficient to slidably surround an annular bearing sleeve 36 mounted on the rear end of the main body portion 20a of the body 20. The bearing sleeve 36 abuts against a retention ring 38 received in the rearward retainer groove 26a of the body 20.

The body 20 includes an angular slot 50 formed transversely therein, with the slot 50 extending from the radially outer surface of the body 20 in an axially forward and radially inward direction to communicate with the interior of the hex bore or socket 24. A generally U-shaped retaining clip 60 has a central base portion 62 and a pair of legs 64 at opposite ends of the central base 62 forming opposite corners 66 thereon. The base 62 of clip 60 is slidably disposed within the angular slot 50, and the two legs 64 extend around the body 20 to locations thereon that are on an opposite side of the axis 12 from the base 62 and the slot 50.

A coil spring 40 surrounds a portion of the body 20 and is disposed between the body 20 and the retraction collar 30. The coil spring 40 abuttingly engages the annular bearing sleeve 36 and directly engages the clip 60. Thus compressed, the coil spring 40 resiliently biases the clip 60 in forward axial and inward radial directions within the slot 50. Because of this direct abutting engagement with the clip 60 and its legs 64 (as discussed above), the resultant reactive axial force exerted by the clip 60 on the coil spring 40 is directed substantially along the axis 12, thus keeping the coil spring 40 coaxially aligned with the body 20.

As can best be seen in FIGS. 3 through 5, the clip 60 is retracted axially rearwardly and radially outwardly in the slot 50, during axially rearward retraction of the retraction collar 30. At the end of this retraction, the corners 66 (at the intersections of the legs 64 with the central base 62) move radially outwardly into contact with the internal surface of the internal hollow bore 34 of the retraction collar 30. This contact substantially prevents further axially rearward movement of the retraction collar 30, thus substantially minimizing the possibility of over-retraction and subsequent cocking or jamming of the retraction collar 30.

Still further, in accordance with the preferred form of the present invention, the coil spring 40 has at least one bight at each of its forward and rearward ends axially collapsed to form respective forward dead coil bights and rearward dead coil bights. This dead coil end bight arrangement can optionally be provided at either the forward or rearward ends of the coil spring 40, or preferably at both ends. Such dead coil bights at the ends of the coil spring 40 allow the coil spring 40 to engage the step on the body 20 and the legs 64 of the clip 60, respectively, in a substantially flat abutting relationship therewith. This, in turn, serves to help maintain the coil spring 40 in a proper, coaxially-aligned relationship with the body 20 and helps eliminate the need for any of the prior art's intermediate sliding sleeves or other such intermediate members between the coil spring 40 and the clip 60. Thus, this arrangement helps eliminate the need for a flat portion on such an intermediate sleeve or member and a corresponding flat portion on the body 20 in order to keep such an intermediate sleeve or other such member properly aligned. This dead coil end bight arrangement, along with the other features of the chuck assembly 10 described above, all contribute to the increased simplification and decreased cost of machining and assembling the chuck assembly 10, as well as helping to minimize the number of required parts.

A retention ring 68 is preferably fixed in the forward retaining groove 26*b* at the forward end of the body 20 and thus serves to retain the above-described components in their assembled condition. The retention ring 68 is preferably in the form of a C-shaped clip ring.

A plunger 70 is received in the plunger bore 28 of the body 20. The plunger 28 is cylindrical or capsule shaped including an annular flange portion 72 extending radially outward from a center portion of the plunger 70. The annular flange portion 72 contacts the generally cylindrical inner wall surface of the plunger bore 28. A plunger spring 74 is received within the plunger bore 28 and abuts against a rearward wall thereof and against the annular flange 72 of the plunger 70. A plunger bearing 76 is provided to retain the plunger 70 within the plunger bore 28. The plunger bearing 76 has an annular ring shape which is received in the forward end of the plunger bore 28 and receives a forward end of the plunger 70 through an annular opening therein. The plunger bearing 76 can be press-fit or otherwise fastened within the end of the plunger bore 28. The flange 72 of the plunger 70 abuts against the plunger bearing 76 when there is no bit received within the chuck assembly 10, as best shown in FIG. 3.

As a bit 14 is inserted into the chuck assembly 10, as shown in FIG. 4, the end of the bit 14 presses against the forward end of the plunger 70 pressing the plunger rearward as illustrated in FIG. 4. The plunger is pressed against the spring force of the spring 74 into a retracted position. As the tool bit 14 is pressed inward, the retaining clip 60 is forced to slide rearwardly and radially outwardly in the angular slot 50, against the bias of the coil spring 40, in order to allow the bit to be inserted. Once the bit is fully seated in the hex socket 24, the base portion of the retaining clip 60 is resiliently urged back downward towards the bottom of the angular slot 50 where it engages the circumferential recess 16 formed on the hex shank 15 of the bit 14. The tool bit 14 is removed from the chuck assembly 10 by the operator sliding the retraction collar 30 axially rearwardly along the body 20 thus compressing the coil spring 40 to allow the retaining clip 60 to retract back up the angular slot 50 and release the tool bit 14 as the tool bit is pressed outward by the plunger 70. The spring force of the plunger spring 74 is preferably selected so as to press the bit forward enough with the centerline of the bit extending vertically so that the circumferential recess 16 in the hex shank 15 is pressed forward so as to prevent re-engagement by the retaining clip 60 when the retraction collar 30 is released by the operator. However, the spring force is also selected to be weak enough so as not to eject the bit from the hex socket. Specifically, the spring force is preferably weak enough to prevent ejection of the bit when the centerline of the bit is ten degrees below horizontal (−10 degrees from horizontal). Thus, an operator can hold the tool 18 with one hand, pull the retraction collar 30 to a released position with the other hand, and then release the retraction collar and pull the tool bit out of the hex socket 24 while maintaining control of the tool 18 with the first hand. The removal of the bit can be accomplished in this manner while the tool is positional such that the centerline of the bit is above −10 degrees from horizontal without the bit falling out.

As seen in FIGS. 1 and 2, shank 22 is a universal shank and includes first and second portions 124, 126. The first portion 124 has a generally hexagonally shaped cross-section with flats 128 thereon. Second portion 126 is located between first portion 124 and sleeve 30. The first portion 124 can optionally be provided with a recessed annular ball groove 124A provided in the exterior surface as shown in phantom in FIG. 6.

Second portion 126 includes a generally cylindrical body 132 having a diameter greater than the diameter of first portion 124. Retaining arms 134 extend radially from cylindrical body 132. The arms 134 extend generally axially along a portion of the cylindrical body 132, terminating before first portion 124. An additional retaining assembly 136 is also located in second portion 126.

Figure 9:
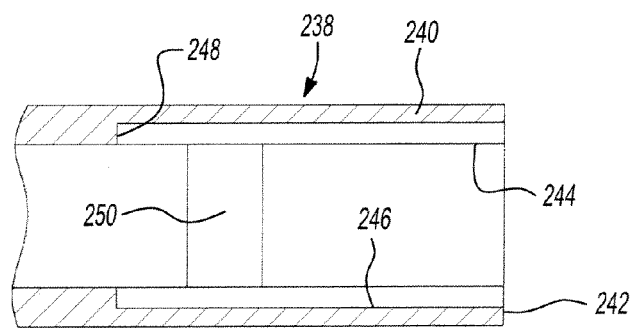
FIG. 9 is a partial sectional view of an additional driver.

Retaining assembly 136 includes a ball 138 and a spring 140 and is retained within recess 142. Recessed portion 142 includes an outer opening 144 having a diameter less than the diameter of ball 138 and an inner portion 146 having a diameter greater than the diameter of ball 138. The spring 140 biases the ball 138 radially outwardly, forcing ball 138 against outer opening 144. Outer opening 144 generally limits the radial travel of ball 138. Retaining assembly 136 can therefore provide an additional engagement with a receiving bore having a recess therein, as seen in FIG. 9 and discussed below.

Figure 7:
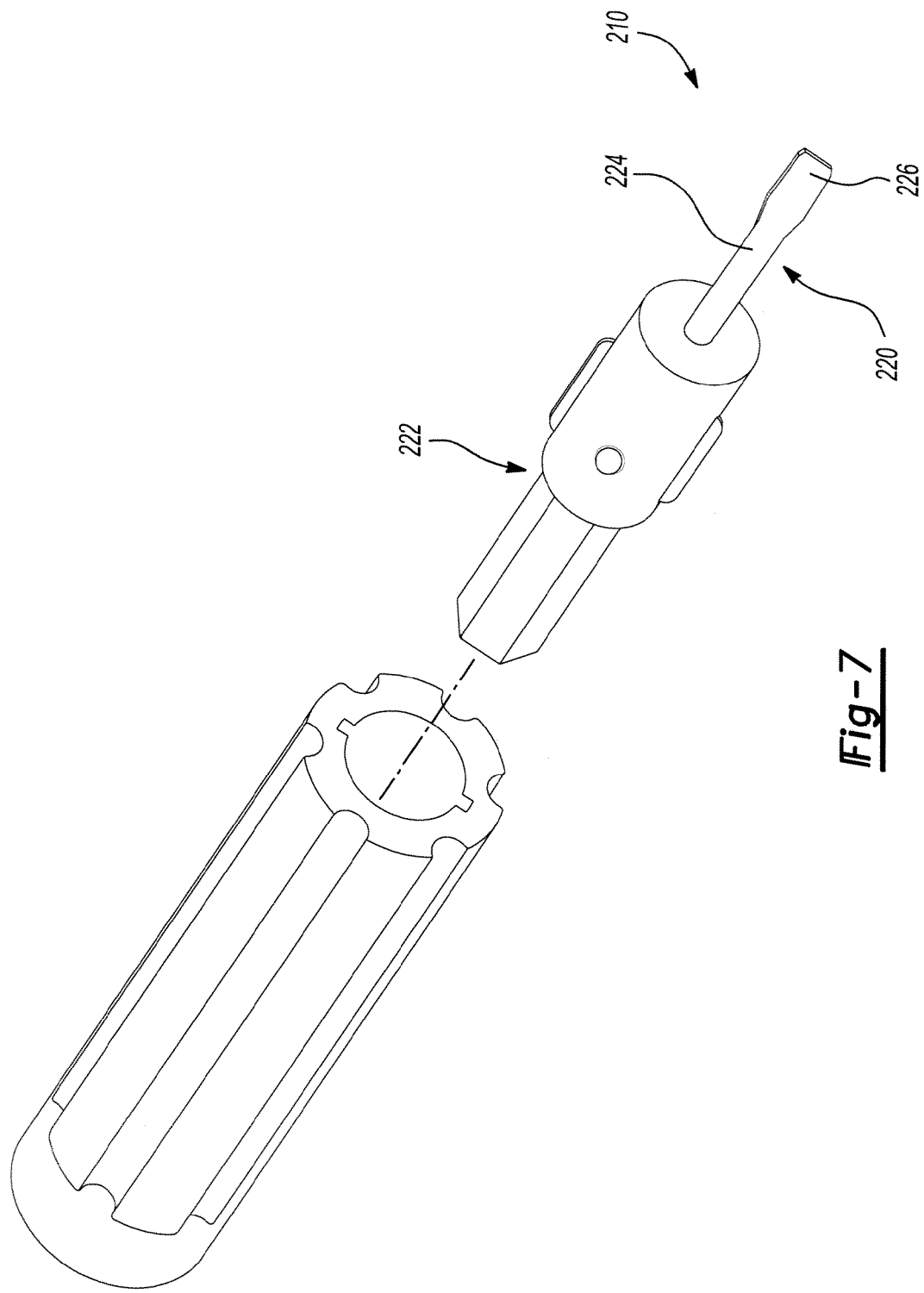
FIG. 7 is a perspective view of a tool assembly.

Alternatively, as seen in FIG. 7, a tool assembly 210 can include a tool member 220 having a shank 222 thereon for mounting the tool assembly 210 for rotation by a hand tool or a power tool. The tool member 220 is shown as a common screwdriver having a head 226 and a shaft 224. However, it is understood that any number of tools can be substituted for the screwdriver shown in FIG. 7. Shank 222 is generally identical to shank 22, and therefore will not be described in detail. As such, shank 22 is discussed below with the understanding that the following equally applies to shank 222.

Shank 22 is universal due to first and second portions 124, 126 being designed to be used with different tools. Shank 22 can be received by a variety of drivers having tool receiving recesses such as those shown in FIGS. 8 and 9.

Figure 8:
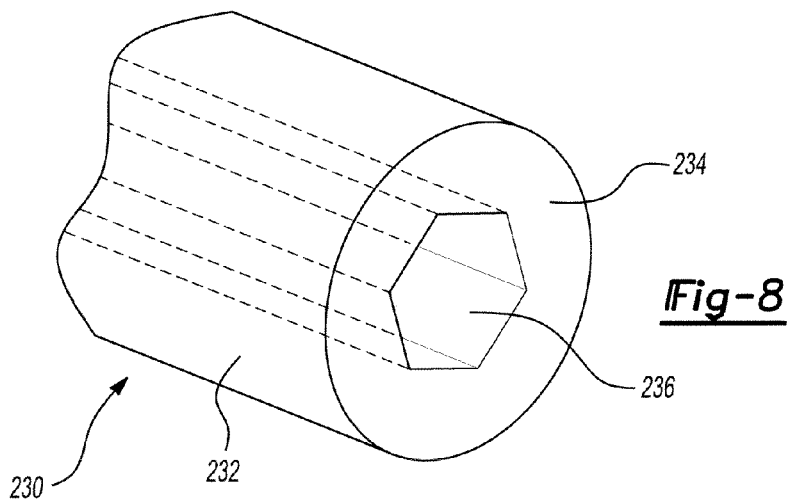
FIG. 8 is a partial perspective view of a driver.

As seen in FIG. 8, a first driver 230 can include a body 232 having an end surface 234 and a hexagonal shaped recess 236 extending therethrough and into the body 232. In this arrangement, first portion 124 can extend into recess 236 and second portion 126 can generally abut end surface 234, thereby providing a driving engagement between driver 230 and chuck assembly 10.

As seen in FIG. 9, a second driver 238 can include body 240 having an end surface 242 and a generally cylindrical recess 244 extending therethrough and generally into the body 240. Axially extending slots 246 are formed in cylindrical recess 244 and include an end surface 248. A recess 250 is also located in cylindrical recess 244. Shank 122 can extend into cylindrical recess 244. Due to its smaller diameter, first portion 124 can extend freely through cylindrical recess 244 and second portion 126 can engage cylindrical recess 244 through arms 134 and ball 138. Arms 134 can be located within slots 246 and abut end surfaces 248. Ball 138 can additionally be located within recess 250.

What is claimed is:

1. A tool bit holder comprising:
a body portion defining a longitudinal bore for removably receiving a tool bit therein, wherein the body portion further comprises a holding member that is biased into the bore to removably retain the tool bit in the bore; and
a universal shank portion extending from said body portion and including first and second portions, said first portion having at least one flat thereon, said first portion being removably engageable directly with a recess in a first tool such that said second portion extends axially away from said first tool, said second portion having at least one protrusion extending radially outwardly therefrom, said second portion being removably engageable directly with a recess in a second tool such that said first portion is received within said recess in said second tool with said at least one protrusion being received in at least one corresponding radial slot that extends radially from said recess in said second tool, said first and second portions disposed axially apart from one another.

2. The tool bit holder of claim 1, wherein said first portion includes a hexagonal cross section.

3. The tool holder of claim 2, wherein said first portion includes a ball groove therein.

4. The tool bit holder of claim 1, wherein said at least one protrusion includes a plurality of radially extending protrusions uniformly distributed about said second portion.

5. The tool bit holder of claim 4, wherein said radially extending protrusions include first and second arms extending from said second portion generally opposite one another.

6. The tool bit holder of claim 1, wherein said second portion is located between said body portion and said first portion.

7. The tool holder of claim 1, further comprising a retaining member displaceably contained within said shank and biased radially outwardly, said retaining member including a portion extending past an outer surface of said shank when in an unengaged position.

8. The tool bit holder of claim 1, wherein the second portion is disposed between the body portion and the first portion.

9. The tool bit holder of claim 1, wherein the body portion further comprises a sleeve that is moveable in the axial direction to release the holding member from engaging the tool bit.

10. The tool bit holder of claim 9, wherein the holding member comprises a spring and a wire form that extends through an angled slot into the bore.

11. The tool holder of claim 1, wherein said first portion includes a ball groove therein.

* * * * *